(12) United States Patent
Trivelpiece et al.

(10) Patent No.: US 10,706,386 B2
(45) Date of Patent: Jul. 7, 2020

(54) MACHINE LEARNING INVENTORY MANAGEMENT

(71) Applicants: Steve E. Trivelpiece, Rancho Santa Margarita, CA (US); Craig E. Trivelpiece, Mission Viejo, CA (US); Matt Marchesano, Laguna Niguel, CA (US); Declan Tarrant, Killorglin (IE); Brian Wicks, Escondido, CA (US)

(72) Inventors: Steve E. Trivelpiece, Rancho Santa Margarita, CA (US); Craig E. Trivelpiece, Mission Viejo, CA (US); Matt Marchesano, Laguna Niguel, CA (US); Declan Tarrant, Killorglin (IE); Brian Wicks, Escondido, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 281 days.

(21) Appl. No.: 15/704,534

(22) Filed: Sep. 14, 2017

(65) Prior Publication Data

US 2019/0080277 A1    Mar. 14, 2019

(51) Int. Cl.
| | |
|---|---|
| G06Q 10/08 | (2012.01) |
| G06Q 20/20 | (2012.01) |
| G06K 9/66 | (2006.01) |
| G06N 20/00 | (2019.01) |
| G06K 9/00 | (2006.01) |
| G06Q 20/32 | (2012.01) |

(52) U.S. Cl.
CPC ....... *G06Q 10/087* (2013.01); *G06K 9/00771* (2013.01); *G06K 9/66* (2013.01); *G06N 20/00* (2019.01); *G06Q 20/203* (2013.01); *G06Q 20/208* (2013.01); *G06Q 20/3224* (2013.01); *G06Q 20/3278* (2013.01)

(58) Field of Classification Search
USPC ........................................... 705/22
See application file for complete search history.

(56) References Cited

U.S. PATENT DOCUMENTS

| | | | |
|---|---|---|---|
| 2015/0099946 A1* | 4/2015 | Sahin | A61B 5/16 600/301 |
| 2015/0223731 A1* | 8/2015 | Sahin | A61B 5/16 600/301 |
| 2018/0204281 A1* | 7/2018 | Painter | G06Q 20/102 |
| 2018/0240322 A1* | 8/2018 | Potucek | G05B 15/02 |

* cited by examiner

*Primary Examiner* — Garcia Ade
(74) *Attorney, Agent, or Firm* — Arent Fox, LLP (57) ABSTRACT

Systems and methods for machine learning inventory management. The methods comprise: capturing images by a plurality of image capture devices of different types (e.g., visual camera, 3D camera and/or thermal camera); reading item identification codes for items represented in the images; and using at least a first portion of the images and known physical appearances of a plurality of items by a machine learning algorithm to learn relationships between the items represented in the images and the item identification codes. At least a second portion of the images are used to learn various types of information that is useful for inventory management (e.g., changes in inventory amounts for display equipment, changes in equipment cleanliness, changes in inventory packaging, item misplacements, etc.).

24 Claims, 6 Drawing Sheets

MACHINE LEARNING INVENTORY MANAGEMENT

FIELD

This document relates generally to inventory management systems. More particularly, this document relates to systems and methods for providing machine learning inventory management.

BACKGROUND

There are many aspects to maintaining good inventory control in a store. Product placement, attractively arranged products, proper grouping of products and sufficient products on the shelves all greatly contribute to increased sales and customer satisfaction. Products on shelves are not static and are constantly changing as customers examine, misplace and purchase items. It takes a significant amount of employee effort to maintain the product displays at their optimum level. Sometimes misplaced items are only discovered during inventory cycle counts.

The current methods are typically either employees or brand managers walk the aisles or sometime RFID enabled systems can notify employees of low values based upon RFID scanned sales. These methods are cumbersome, expensive or only provide partial coverage for the inventory.

SUMMARY

The present disclosure concerns implementing systems and methods for machine learning inventory management. The methods comprise: capturing images by a plurality of image capture devices of different types (e.g., a visual camera, a 3D camera, and/or a thermal camera); reading item identification codes for items represented in the images; and using at least a first portion of the images and known physical appearances of a plurality of items by a machine learning algorithm to learn relationships between the items represented in the images and the item identification codes.

In some scenarios, Point of Sale ("POS") transaction information is used to learn patterns of changes in amounts of inventory for given items over time. At least a second portion of the images which were captured at the POS are used to identify items represented therein based on the learned relationships between the items represented in the first portion of images and the item identification codes. The images, the known physical appearances, the item identification codes, and the POS transaction information may also be used to detect theft and/or learn patterns of theft over time. The images are further be analyzed to learn changes in item packaging. The changes in image packaging can further be learned based on at least one of the item identification codes, POS transaction information, and stored information for display equipment inventory.

In those or other scenarios, at least a second portion of the images are used to learn at least one of: a change in a type of item disposed on a piece of equipment; a change in an amount of an item disposed on a piece of equipment; conditions of equipment or areas adjacent to the equipment; individuals' interactions with equipment and inventory disposed on the equipment; when equipment has been moved to a given location; and/or when an item has been misplaced. If the system learns that the equipment has been moved to a given location, then learned information therefor may be reset.

DESCRIPTION OF THE DRAWINGS

The present solution will be described with reference to the following drawing figures, in which like numerals represent like items throughout the figure.

DETAILED DESCRIPTION

It will be readily understood that the components of the present solution as generally described herein and illustrated in the appended figures could be arranged and designed in a wide variety of different configurations. Thus, the following more detailed description of the present solution, as represented in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There is a need for a more generic and automated method of monitoring display equipment stocking. Accordingly, the present solution provides systems and methods for machine learning inventory management. The machine learning is achieved using captured images and/or videos. Notably, videos comprise a sequence of images. As such, the present solution is described herein in terms of images. This description is intended to encompass video applications as well.

The methods involve continuously monitoring display equipment (e.g., shelves) and/or POS devices using a network of image capturing devices (e.g., 3D, visual and IR cameras). With machine learning, the network is able to continuously monitor a facility (e.g., a retail store) and learn (a) how each piece of display equipment (e.g., shelve) should appear at different times of day (e.g., the opening and/or closing of the facility), (b) how each piece of display equipment should appear as inventory is removed therefrom, and (c) when restocking of the piece of display equipment should be performed. The network is also able to detect and identify misplaced items by color, pattern, size, heat signatures, and/or location. The network is further able to determine when a piece of display equipment needs to be cleaned and/or determine when items disposed on the piece of display equipment need to be rearranged/reorganized to put the piece of display equipment back in its optimal state.

An inventorying system implementing the present solution is able to operate without having knowledge of the inventory items other than their physical appearances and/or initial locations within a facility. By adding image capture devices at POS stations and/or other item checking stations disposed on the sales floor, the captured images can be correlated to item identification information obtained from product labels (e.g., barcodes) and/or product markers (e.g., Radio Frequency Identification ("RFID") tags). This correlation facilitates the machine learning feature of the present solution to know and report product identification codes (e.g., Universal Product Codes ("UPCs") as well. Knowledge of the product identification codes helps with restocking since individuals (e.g., employees) are not required to go to the location to determine what product(s) is(are) missing from the display equipment (e.g., shelve).

The inventorying system is able to determine normal and abnormal display equipment (e.g., shelve) conditions through machine learning, as well as alert/notify individuals (e.g., employees) of display equipment states. Alert/notification verifications and/or challenges by individuals can also be used as machine learning feedback so that the inventorying system continues to refine when alert/notification issuance is proper.

Figure 1:
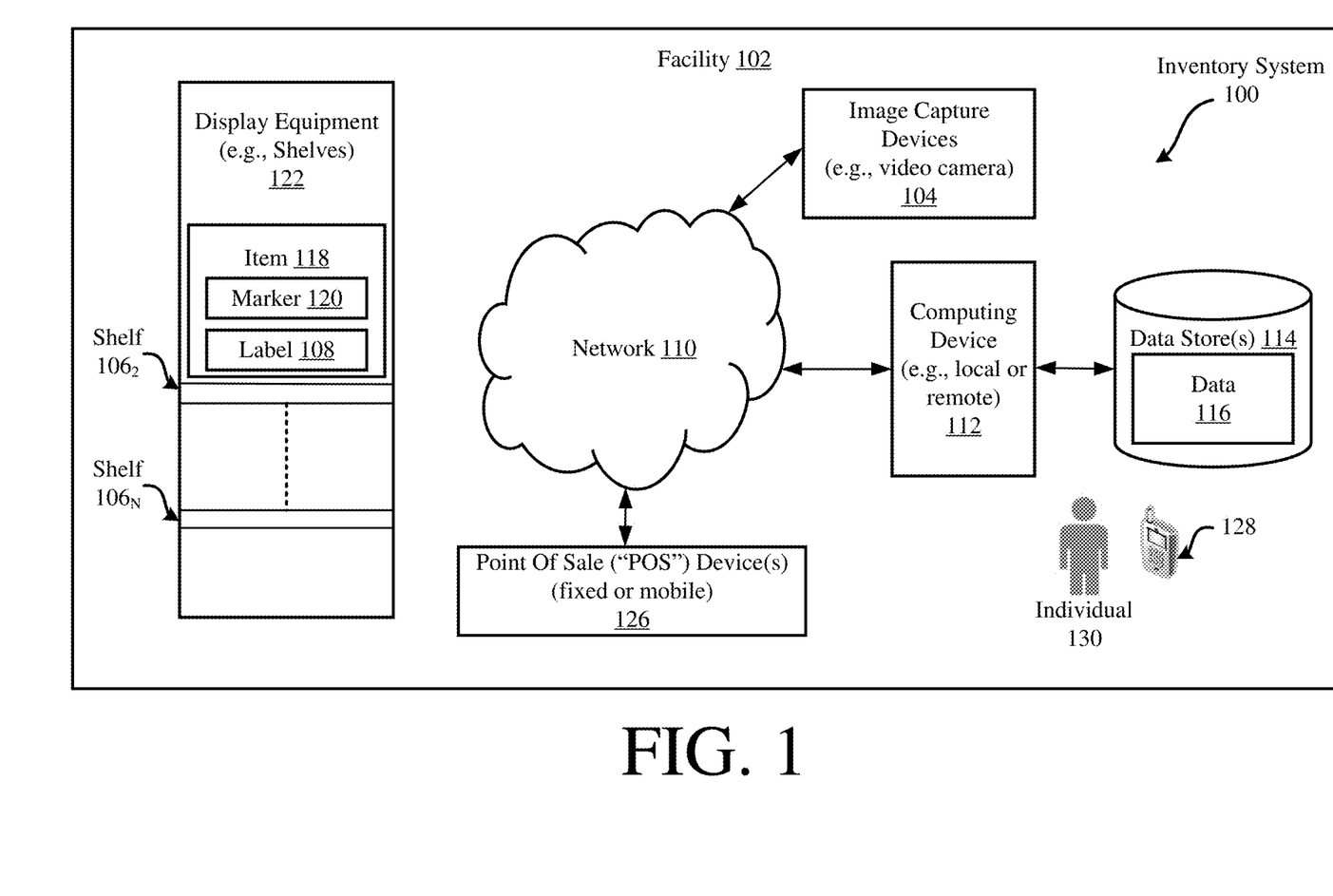
FIG. 1 is a schematic illustration of an illustrative inventory system.

Referring now to FIG. 1, there is provided an illustration of an illustrative inventory system 100. Inventory system 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 is disposed on display equipment 122. The display equipment includes, but is not limited to, shelves $106_1$-$106_N$, display cabinets, and/or exhibit cases. The item 118 has a marker (e.g., an EAS security tag, or an RFID security tag) 120 and/or label 108 (e.g., barcode) coupled thereto. This coupling is achieved via an adhesive (e.g., glue), a mechanical coupler (e.g., straps, clamps, snaps, etc.), a weld, a chemical bond or other means.

Markers and labels are well known in the art, and therefore will not be described in detail here. Generally, the marker 120 and/or label 108 is(are) configured to visually and/or auditorily present item level information to people located in proximity thereto (e.g., customers). The information can include, but is not limited to, an item description, item nutritional information, a promotional message, an item regular price, an item sale price, a currency symbol, and/or a source of the item. Any known or to be known type of marker and/or label can be used herein without limitation.

A plurality of image capture devices 104 are also provided within facility 102. The image capture devices include, but are not limited to, visual cameras, 3D cameras, and/or IR cameras. Each of the listed types of cameras are well known in the art, and therefore are not described in detail herein. Any known or to be known visual, 3D and/or IR camera can be used herein without limitation. For example, the visual camera includes a digital video camera configured to produce a 2D image of object(s). The 3D camera includes a 3D video camera configured to produce 3D images indicating the distance between object(s) and a reference point. The IR camera includes a thermal imaging camera configured to produce thermal images. The images produced by these three types of cameras are collectively used herein for machine learning inventory management, as discussed herein. The image capture devices 104 can be fixed or mobile. In the mobile scenarios, the image capture device(s) comprise a robot (e.g., an Unmanned Ground Vehicle ("UGV") with a camera attached thereto) or a drone (e.g., an Unmanned Aerial Vehicle ("UAV") with a camera attached thereto).

Figure 2:
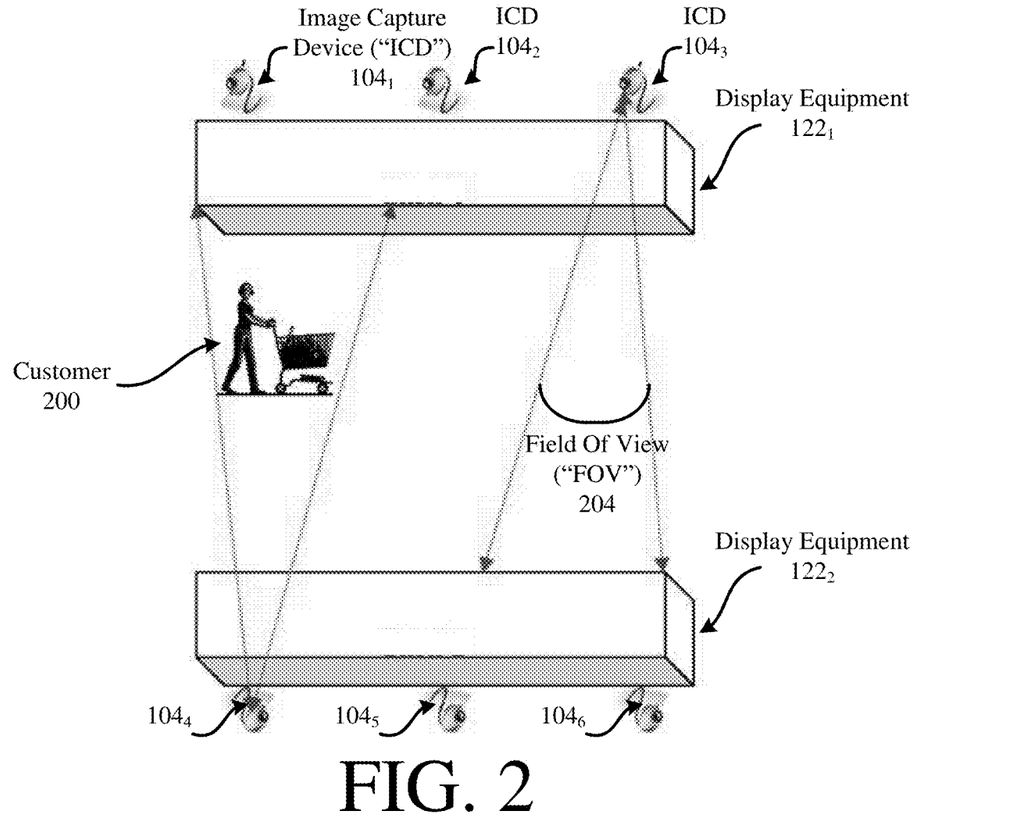
FIG. 2 is an illustration of an illustrative display equipment and image capture device arrangement.
Figure 3:
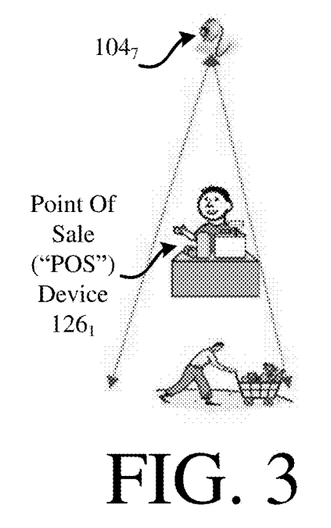
FIG. 3 is an illustration of an illustrative POS device and image capture device arrangement.
Figure 4:
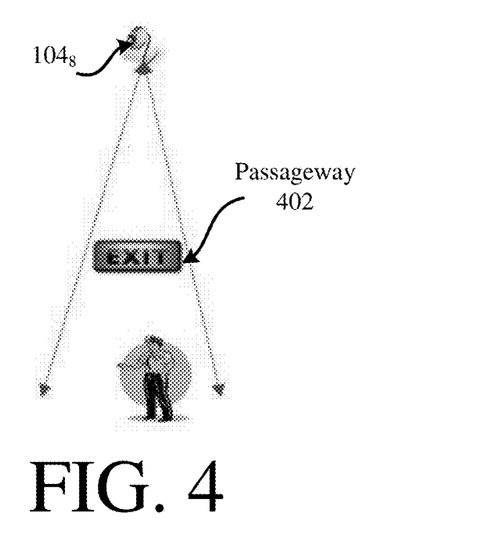
FIG. 4 is an illustration of an illustrative passageway and image capture device arrangement.

The image capture devices 104 are strategically placed throughout the facility. For example, as shown in FIG. 2, image capture devices $104_1$, $104_2$, $104_3$, $104_4$, $104_5$, $104_6$ are respectively placed in proximity to display equipment $122_1$, $122_2$. In the case that the image captured devices are fixed devices, each image capture device $104_1$-$104_6$ is mounted to the ceiling above the display equipment $122_1$, $122_2$ or mounted on the display equipment $122_1$, $122_2$ such that at least a portion of an opposing piece of display equipment is within its Field Of View ("FOV") 204. As shown in FIG. 3, at least one image capture device $104_7$ is disposed in proximity to a transaction location $126_1$ such that it can monitor activity in a geographic area where a POS device $126_1$ resides. As shown in FIG. 4, an image capture device $104_8$ is disposed in proximity to a passageway 402 of the facility 102. The present solution is not limited to the particular image capture device placements shown in FIGS. 2-4. Other capture device arrangements/placements can be used herein without limitation in accordance with a particular application. For example, one or more image capture devices can additionally or alternatively be disposed in proximity to an item checking device disposed within the facility (e.g., on the sales floor of the facility). Image capture devices $104_1$-$104_8$ are collectively referred to herein as image capture devices 104.

The image capture devices 104 and POS devices 126 are communicatively coupled to a computing device 112 via a network 110. The communications can be achieved using wired or wireless communications links. The network includes, but is not limited to, an Intranet and/or the Internet. The computing device 112 includes, but is not limited to, a server. The computing device 112 is configured to write data 116 to and read data 116 from a data store 114. The data 116 includes any information that is useful for managing inventory in a single facility or multiple facilities distributed throughout a geographic area (e.g., city, state, country, or world). The data 116 can be provided from third parties (e.g., manufactures, distributors, etc.), collected on site (e.g., in a retail store at time of receipt, at time of purchase transaction, and/or at the time of an item check using an item checking device located on the sales floor), and/or derived using machine learning algorithms.

The data 116 includes, but is not limited to, item level information and/or display related information. The item level information includes, but is not limited to, item images, item packaging images, item identification codes, item locations, item descriptions, item packaging descriptions, item regular prices, item sale prices, currency symbols, and/or sources of the items. The display related information includes, but is not limited to, display equipment images, display equipment descriptions, information specifying relationships between display equipment and items, information specifying patterns of display equipment visual states, information specifying relationships between display equipment visual states and times of day/year, information specifying relationships between display equipment states and alarm/notification issuances, and/or information specifying relationships between display equipment states and alarm/notification verifications/challenges.

Inventory system 100 further includes POS devices 126. POS devices are well known in the art, and therefore will not be described herein. Any known or to be known POS device can be used herein without limitation. The POS devices 126 can include fixed POS devices and/or mobile POS devices (e.g., mobile phones running POS software). The POS devices 126 are configured to read the markers 120 and/or labels 108 coupled to items 118, and facilitate transactions (e.g., purchase, rent, or loan) for the items. In this regard, the POS devices capture or acquire item identification codes and/or transaction information during use. This captured/acquired information is used as feedback information for a machine learning function of the computing device 112 and/or image capture devices 104. For example, the feedback information is used to relate item identification codes with images of items captured by image capture devices 104 and/or information specifying item characteristics (e.g., color, size, pattern, thermal signature, etc.).

Although a single computing device 112 is shown in FIG. 1, the present solution is not limited in this regard. It is contemplated that more than one computing device can be implemented. Also, the present solution is not limited to the exemplary inventory system architecture described in relation to FIGS. 1-4.

Figure 5:
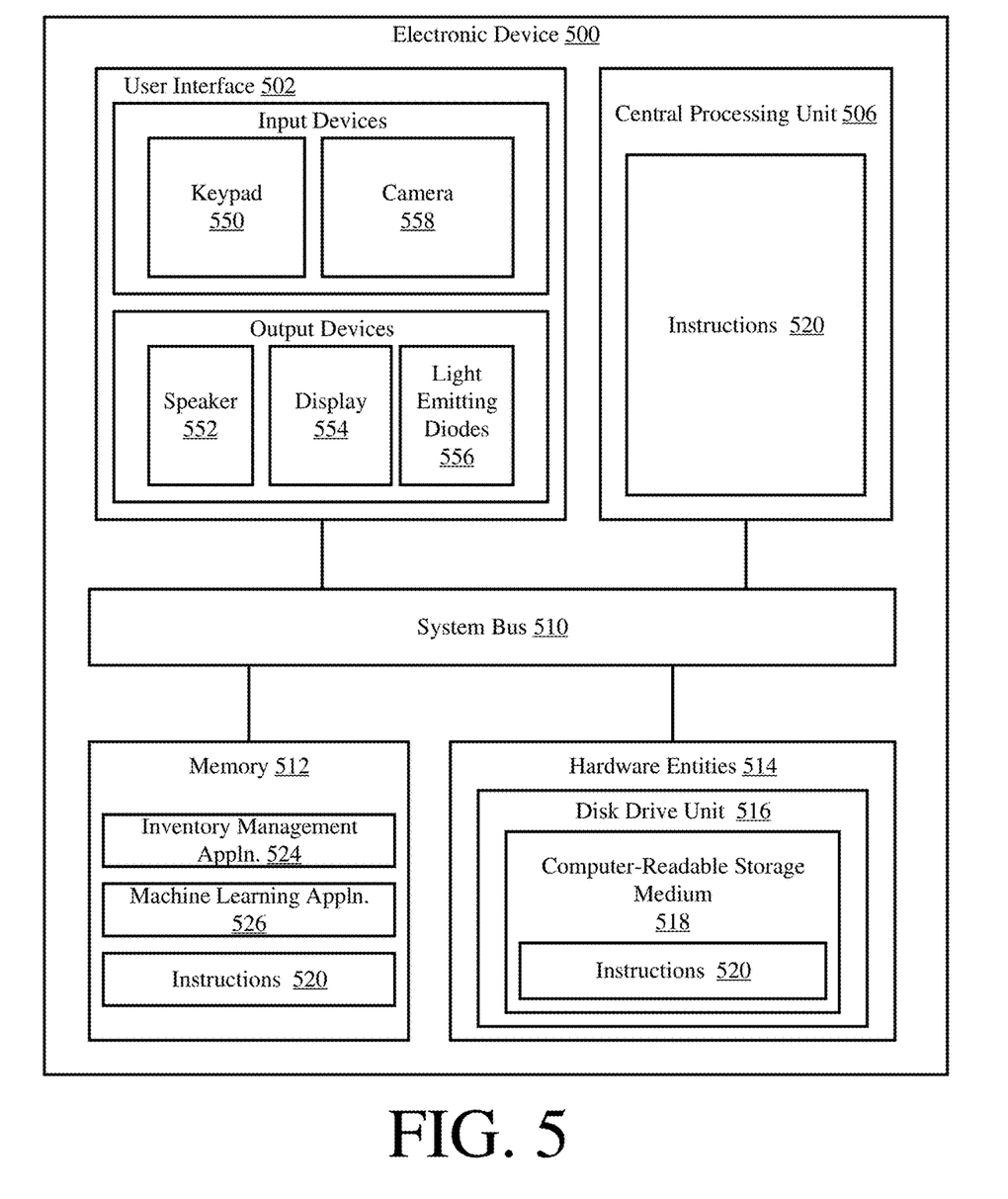
FIG. 5 is a block diagram of an illustrative electronic device.

Referring now to FIG. 5, there is provided a detailed block diagram of an exemplary architecture for an electronic device 500. Image capture devices 104 and/or computing device 112 of FIG. 1 is the same as or substantially similar to electronic device 500. As such, the following discussion of electronic device 500 is sufficient for understanding image capture devices 104 and computing device 112.

Electronic device 500 may include more or less components than those shown in FIG. 5. However, the components shown are sufficient to disclose an illustrative embodiment implementing the present solution. The hardware architecture of FIG. 5 represents one embodiment of a representative electronic device configured to facilitate improved inventory management. As such, the electronic device 500 of FIG. 5 implements at least a portion of a method for providing machine learning inventory management in accordance with the present solution.

Some or all the components of the electronic device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the electronic device 500 comprises a user interface 502, a Central Processing Unit ("CPU") 506, a system bus 510, a memory 512 connected to and accessible by other portions of electronic device 500 through system bus 510, and hardware entities 514 connected to system bus 510. The user interface can include input devices (e.g., a keypad 550 and/or a camera 558) and output devices (e.g., a speaker 552, a display 554, and/or Light Emitting Diodes ("LEDs") 556), which facilitate user-software interactions for controlling operations of the electronic device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the electronic device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 322 for execution by the electronic device 500 and that cause the electronic device 500 to perform any one or more of the methodologies of the present disclosure.

In some scenarios, the hardware entities 514 include an electronic circuit (e.g., a processor) programmed for facilitating machine learning inventory management. In this regard, it should be understood that the electronic circuit can access and run an inventory management application 524 and/or a machine learning application 526 installed on the electronic device 500.

The machine learning application 526 implements Artificial Intelligence ("AI") that provides the electronic device 500 with the ability to automatically learn and improve data analytics from experience without being explicitly programmed. The machine learning application employs one or more machine learning algorithms that learn various information from accessed data (e.g., via pattern recognition and prediction making). Machine learning algorithms are well known in the art, and therefore will not be described herein in detail. Any known or to be known machine learning algorithm can be used herein without limitation. For example, in some scenarios, the machine learning application 526 employs a supervised learning algorithm, an unsupervised learning algorithm, and/or a semi-supervised algorithm. The learning algorithm(s) is(are) used to model inventory decisions based on data analysis (e.g., captured images, item identifiers (e.g., UPCs), POS transaction information, display equipment information, and other information).

For example, the learning algorithm(s) is(are) configured to: detect a temporal pattern of an inventory level for a given piece of display equipment from which predictions can be made as to when items need to be stocked and/or when floor displays need to be attended to for optimizing sales; and/or detect a temporal pattern of overall inventory management for a given facility from which recommendations can be made for improving inventory management, employee management and/or store profitability. The machine learning algorithm(s) is(are) also configured to facilitate the detection of item misplacements, potential theft, changes in item characteristics, changes in item packaging, changes in item popularity, and/or patterns thereof. The present solution is not limited to the particulars of this example.

The software applications 524, 526 are generally operative to: obtain item level information and/or other information (e.g., from markers (e.g., markers 120 of FIG. 1) and/or labels (e.g., labels 108 of FIG. 1) coupled to items (e.g., items 118)); use information from POSs, item checking device, and/or image capture devices located in proximity to the POS devices to relate item identifiers with images and/or characteristics of inventory; compare POS transaction information with content of images to detect possible theft or misplacement of an item; generate an output (e.g., an alert or notification) indicating that a possible theft or misplacement of an item has been detected at a POS device; use the POS information for machine learning purposes; obtain display related information; obtain images captured by at least camera 558; process the images; store the images in a datastore (e.g., memory 512 of FIG. 5 or datastore 114 of FIG. 1) so as to be associated with the respective item level information and display related information; analyzing the images to automatically learn and update packaging changes associated with a given item identifier; monitor display equipment (e.g., display equipment 122 of FIG. 1) in the FOV of the camera 558; track changes in the amount of items and/or types of items disposed on the monitored display equipment; use machine learning to learn and understand different states and/or conditions of the display equipment (e.g., a normal condition/state, a cleanup condition/state, a restocking condition/state, and/or a possible theft condition/state); use machine learning (e.g., on colors, patterns, size/shape and location) to learn and understand different states and/or conditions of inventory (e.g., properly located, misplaced, original packaging, new packaging, undamaged and/or damaged); generate alerts and/or notifications when certain conditions/states of display equipment and/or inventory are detected (e.g., the alert/notification comprising an indication of the quantity of an item needed for restocking the display equipment or the location of a misplaced item (e.g., a refrigerated and/or frozen item on a shelf outside of the refrigeration equipment)); prioritize the alerts and/or notifications based on certain criteria (e.g., total sales and/or geographic area); cause alerts and/or notifications to be output; and/or reset data when display equipment is moved to a particular location (e.g., an exclusion area).

Other functions of the software applications 524, 526 will become apparent as the discussion progresses.

Figure 6A:
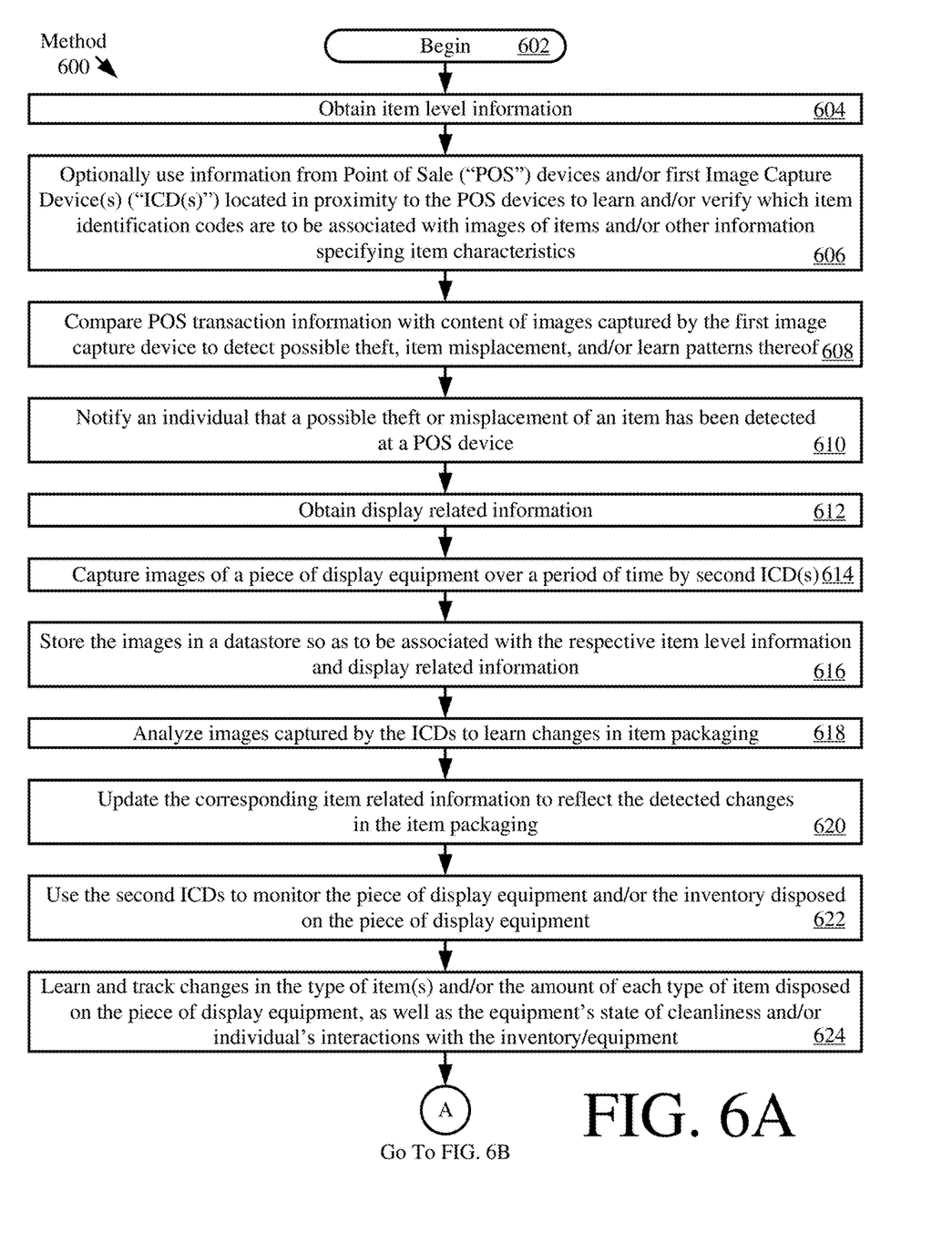
FIGS. 6A-6B (collectively referred to as "FIG. 6") provide a flow diagram of an illustrative method for video machine learning inventory management.

Referring now to FIG. 6, there is provided a flow diagram of an illustrative method 600 for machine learning inventory management. As shown in FIG. 6A, method 600 begins with 602 and continues with 604 where item level information is obtained by a computing device (e.g., computing device 112 of FIG. 1). The item level information includes, but is not limited to, item images, item packaging images, item identification codes, item locations, item descriptions, item packaging descriptions, item regular prices, item sale prices, currency symbols, and/or sources of the items. At least some of the item level information is obtained from third parties (e.g., manufactures, distributors, etc.), collected on site (e.g., in a retail store at the time of receipt or at time of a purchase transaction), derived using image analysis, and/or derived using machine learning algorithms.

If the item identification codes are not related to the other item level information and/or the relationships between the same needs to be verified, the method 600 can continue with optional 606 where machine learning operations are performed. In 606, the item identification codes (e.g., UPCs) are associated with item images and/or other information specifying item characteristics based on information from POS devices (e.g., POS device(s) 126 of FIG. 1 and/or POS device 126$_1$ of FIG. 3) and/or first image capture devices (e.g., camera 104$_7$ of FIG. 3) located in proximity to the POS devices. For example, information from a POS device includes an item unique code read from a marker (e.g., marker 120 of FIG. 1 and/or label 108 of FIG. 1) and/or an item price. Information from the first image capture device includes an image of the item that was read by the POS device. The image is stored so as to be associated with the item unique code and/or item price. The image may also be analyzed to determine the characteristics of the item (e.g., size, color, pattern, etc.). The item characteristics are then used (along with known physical characteristics of items) to relate the item identification code to other item related information (e.g., item packaging images, item descriptions, item packaging descriptions, item regular prices, item sale prices, currency symbols, and/or sources of the items). In this regard, the machine learning algorithm learns item identification codes, item pricing, item popularity, item characteristics and/or item packaging characteristics associated with items having particular item identification codes based on POS information. The present solution is not limited to the particulars of this example.

In 608, POS transaction information is compared with content of images captured by the first image capture devices to detect possible theft, item misplacement, and/or learn patterns thereof. For example, an item identification code is used to access stored data (e.g., date 116 of FIG. 1) specifying characteristics of the respective item and/or item packaging. The image(s) is(are) then analyzed to detect the object represented therein and determine the object's characteristics. The results of the image analysis are then compared to the accessed stored data to determine if a match exists therebetween (e.g., by a certain percentage). If a match does not exist, then a possible theft or item misplacement is detected. The present solution is not limited to the particulars of this example.

If such a detection is made, then an individual (e.g., individual 130 of FIG. 1) is notified of a possible theft or misplacement of the item. The notification can take any form, such as an alert (e.g., an auditory, visual or tactile alert) or message (e.g., a text message or an email message). The notification can be communicated from the computing device to a mobile device (e.g., mobile phone 128 of FIG. 1) carried by the individual via a network (e.g., network 110 of FIG. 1). In response to the notification, the individual can take measures to verify the possible theft or item misplacement, and/or dispatch the appropriate personal (e.g., security, police, or other employee) to address the possible theft or item misplacement.

Next in 612, display related information is obtained. The display related information includes, but is not limited to, display equipment images, display equipment descriptions, information specifying relationships between display equipment and items, information specifying patterns of display equipment visual states, information specifying relationships between display equipment visual states and times of day, information specifying relationships between display equipment states and alarm issuances, and/or information specifying relationships between display equipment states and alarm verifications/challenges. At least some of the display related information is obtained from third parties (e.g., manufactures, distributors, etc.), collected on site (e.g., in a retail store at the time of receipt and/or during display equipment monitoring), derived using image analysis, and/or derived using machine learning algorithms.

Thereafter in 614, images of at least one piece of display equipment (e.g., display equipment 122 of FIG. 1) are captured by second image capture devices (e.g., image capture devices $104_1, \ldots, 104_6$ of FIG. 2) over a period of time (e.g., minutes, hours, days, weeks, months, years, etc.). The images are stored in a datastore (e.g., memory 512 of FIG. 5 and/or datastore 114 of FIG. 1) so as to be associated with the respective item level information and display related information, as shown by 616. In some scenarios, unique identifiers of the second image capture devices are stored (e.g., in datastore 114 of FIG. 1) so as to be associated with the respective item level information and display related information at given times. The unique identifiers of the second image capture devices are used to respectively relate images captured thereby to the item level information and display related information in the datastore. The present solution is not limited in this regard.

The images captured by the first and/or second image capture devices are analyzed in 618 to learn changes in item packaging. Read item identification codes, POS transaction information, and/or display related information is(are) also used here. If such a change is detected (e.g., in size, color, shape, pattern, etc.), then the corresponding item related information is updated to reflect the detected changes in item packaging, as shown by 620.

The second ICDs are then used in 622 to monitor the piece of display equipment and/or the inventory (e.g., item 118 of FIG. 1) disposed on the piece of display equipment. Images captured by the second ICDs are used in 624 to learn and track changes in the type of item(s) and/or the amount of each type of item disposed on the piece of display equipment, as well as the equipment's state of cleanliness and/or individual's interactions with the equipment/inventory.

The changes in item types can be identified by: identifying objects represented in the images; determining the colors, shapes, patterns, heat signatures, and/or other characteristics of the identified objects; determining (if possible) an item identification code (e.g., if a barcode is visible); comparing the determined item identification code, colors, shapes, patterns, heat signatures and/or other item characteristics to that contained in the pre-stored item related information; selecting an item type based on results of the comparing; and comparing the selected item type to that specified in the display related information.

The changes in an item amount can be determined by: identifying objects represented in the images; counting the number of visible items $N_{VI}$ in the images (e.g., per shelf); and optionally adding to the number $N_{VI}$ an offset value $V_{Offset}$ estimating the number of items which are not visible in the images (e.g., per shelf) (i.e., $N_{VI}+V_{Offset}$). Upon completing 624, method 600 continues with 626 of FIG. 6B.

The equipment's state of cleanliness can be tracked by analyzing a series of images to: detect when an item's packaging has been damaged; detect when the contents of an item have spilled; detect when an item has been misplaced on the piece of display equipment or in an area adjacent to the piece of display equipment (e.g., on the ground in an aisle); and/or detect when an individual is cleaning the piece of display equipment. Misplacement of an item can be determined using the thermal signature of an item relative to the thermal signatures of the other items disposed on the piece of display equipment. In this way, the image analysis can determine when a frozen/refrigerated item has been placed on a piece of display equipment absent of a refrigerator or freezer.

Individuals' interactions with the equipment/inventory can be tracked by analyzing a series of images to: detect when an individual takes an item off the display equipment; detect if and/or when the item is returned to the display equipment; determine if the item is placed in something other than the display equipment (e.g., a shopping cart, a bag, a purse, a coat pocket, etc.); and/or determine if a marker/label is being removed from the item and/or replaced with another marker/label. The image analysis can also be performed to detect: when an individual is attempting to break into a locked piece of display equipment; and/or when an individual is attempting to break a coupler coupling an item to the piece of display equipment. The image analysis can also be performed to detect when the piece of display equipment is being restocked by an individual.

Figure 6B:
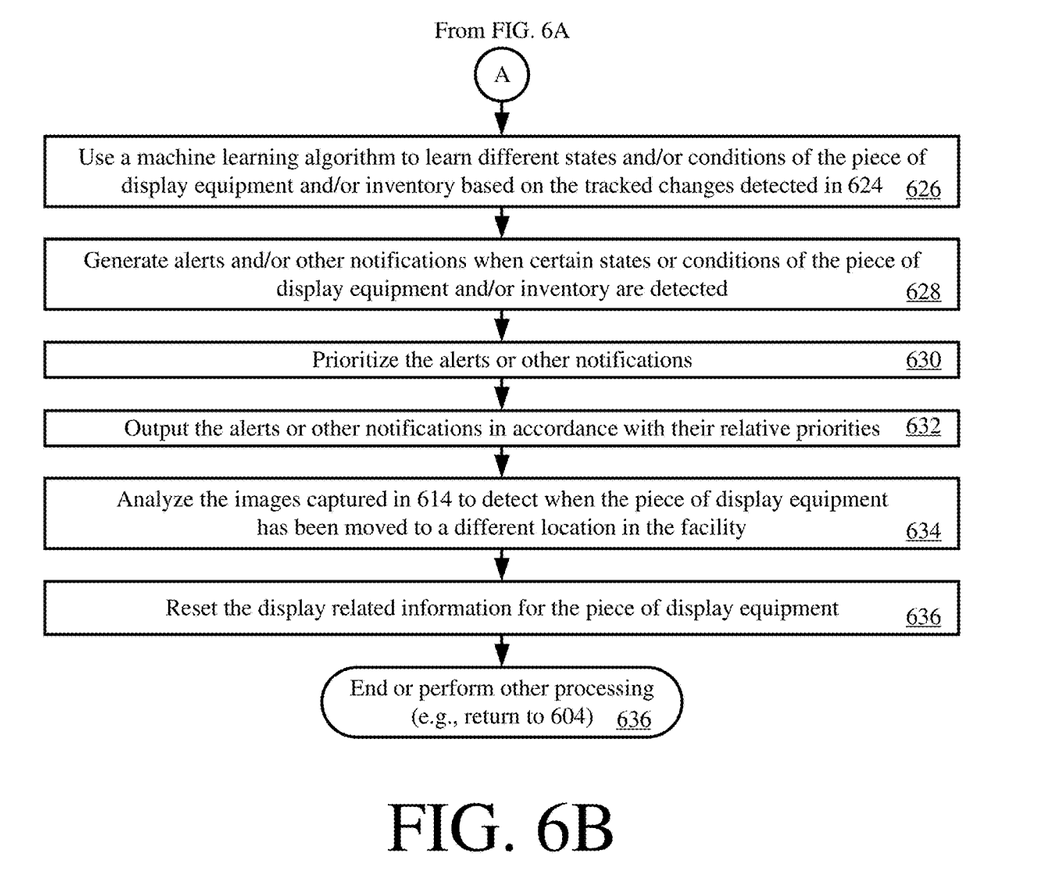

As shown in FIG. 6B, 626 involves using a machine learning algorithm to learn different states and/or conditions of the piece of display equipment and/or inventory based on the tracked changes detected in 624. The machine learning algorithm can include, but is not limited to, a supervised learning algorithm, an unsupervised learning algorithm, and/or a semi-supervised algorithm. Each of the listed machine learning algorithms are well known in the art, and therefore will not be described herein. Any known or to be known machine learning algorithm can be used herein without limitation. The display equipment states and/or conditions include, but are not limited to, fully stocked state/condition, partially stocked state/condition, empty state/condition, restocking condition/state, clean state/condition, dirty/cleanup state/condition, normal state/condition, and/or possible theft condition/state. The inventory states and/or conditions include, but are not limited to, properly located, misplaced, original packaging, new packaging, undamaged and/or damaged.

In next 628, alerts and/or notifications are generated when certain states and/or conditions of the inventory and/or piece of display equipment are detected. For example, an alert and/or notification is generated when an item has been misplaced, an item's packaging has been damaged, a spill has occurred in an aisle, the display equipment needs to be cleaned or restocked, the items on the display equipment need to be reorganized, and/or a possible theft is occurring. The present solution is not limited to the particulars of this example.

The alerts and/or notifications are prioritized in 630 in accordance with a pre-defined priority scheme. For example, an alert/notification for possible theft is assigned a higher priority than an alert/notification for item misplacement, damage packaging, item restocking and/or item reorganization. A spill alert/notification is assigned a higher priority than an alert/notification for possible theft, item misplacement, damage packaging, item restocking and/or item reorganization. An alert/notification for item misplacement is assigned a higher priority than an alert/notification for damage packaging, item restocking and/or item reorganization. An alert/notification for item restocking is assigned a higher priority than an alert/notification for damage packaging and/or item reorganization. An alert/notification is assigned a higher priority than an alert/notification for item reorganization. The present solution is not limited in this regard.

After completing the alert/notification prioritization, the alerts/notifications are output in accordance with their assigned priorities, as shown by 632. The output of the alerts and/or notifications can take any known or to be known form. In this regard, the alert/notification outputs can include, but are not limited to, auditory outputs, visual outputs, and/or tactile outputs. The auditory outputs can include, but are not limited to, sounds output from speakers (e.g., beeps, sirens, etc.). The visual outputs can include, but are not limited to, emitted colored light (flashing or constant), messages presented on electronic displays, and/or information presented in a Graphical User Interface ("GUI") of a computing device (e.g., a map, a graph, a chart, a flashing icon, etc.). The tactile outputs can include, but are not limited to, vibrations of an electronic device (e.g., a mobile phone) and/or increased/decreased temperature of an electronic device.

As shown by 634, the images captured in 614 can also be analyzed to detect when the piece of display equipment has been moved to a different location in the facility. In response to such a detection, 636 is performed to reset the display related information for the piece of display equipment. Subsequently, 636 is performed where method 600 ends or other processing is performed.

Notably, the present solution is not limited to the particular order of 604-636 shown in FIGS. 6A-6B. Operations of 604-636 can occur in any order selected in accordance with a particular application.

Figure 7:
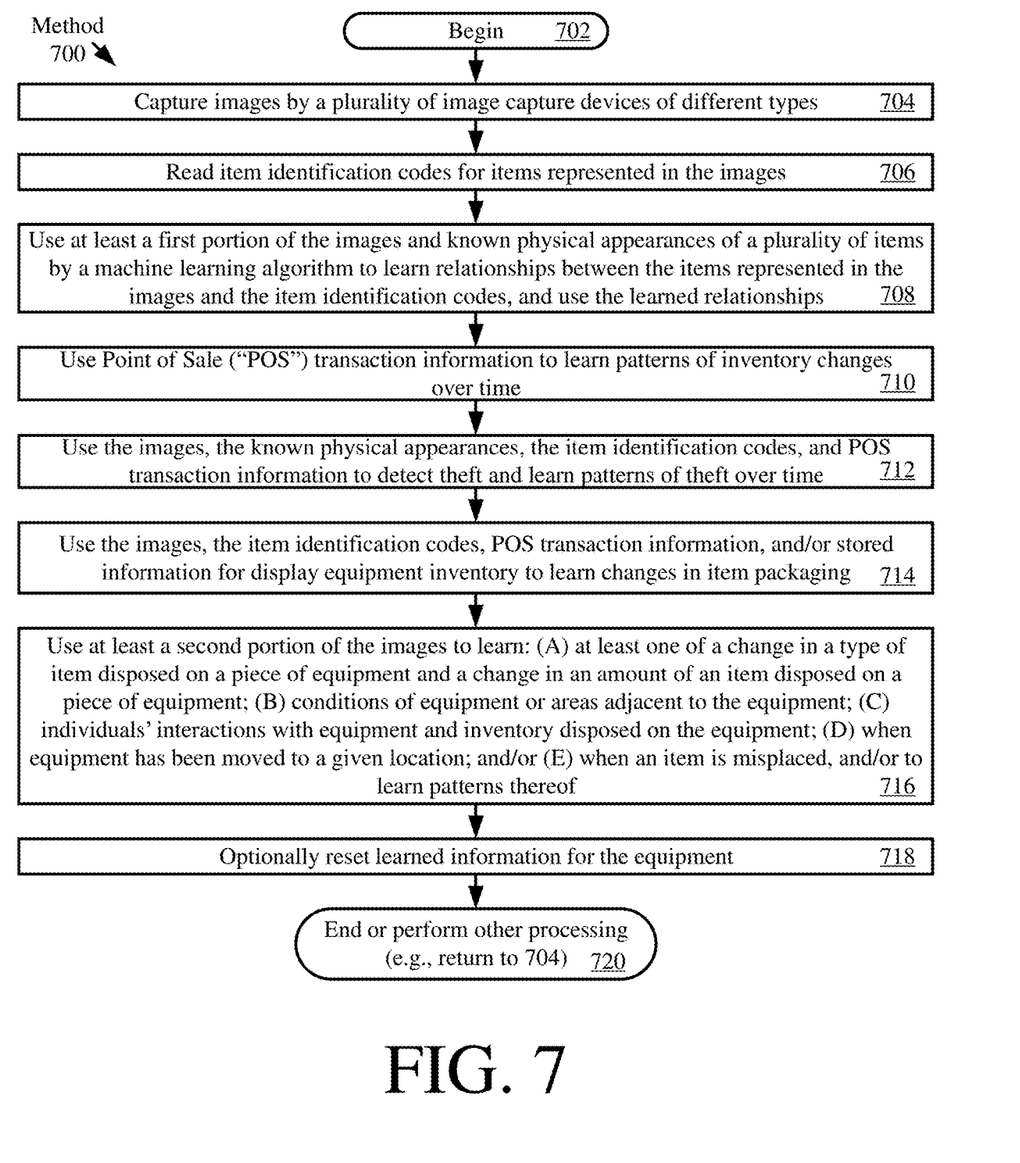
FIG. 7 is an illustration of an illustrative method for machine learning inventory management.

Referring now to FIG. 7, there is provided a flow diagram of an illustrative method 700 for machine learning inventory management. Method 700 begins with 702 and continues with 704 where a plurality of image capture devices capture images. The image capture devices are of different types. For example, the image capture devices comprise at least one visual camera, at least one 3D camera, and at least one thermal camera. Next in 706, operations are performed to read item identification codes for items represented in the images. At least a first portion of the images and known physical appearances of a plurality of items are used by at least one machine learning algorithm to learn relationships between the items represented in the images and the item identification codes, as shown by 708. 708 may also involve using at least a second portion of the images which were captured at a POS to identify items represented therein based on the learned relationships between the items represented in the first portion of images and the item identification codes.

Upon completing 708, method 700 continues with 710-716. 710-716 involve: using POS transaction information to learn patterns of changes in amounts of inventory for given items over time; using the images, the known physical appearances, the item identification codes, and POS transaction information to detect theft and learn patterns of theft over time; and/or using the images, the item identification codes, POS transaction information, and/or stored information for display equipment inventory to learn changes in item packaging. 710-716 also involve using at least a second portion of the images to learn: (A) at least one of a change in a type of item disposed on a piece of equipment and a change in an amount of an item disposed on a piece of equipment; (B) conditions of equipment or areas adjacent to the equipment; (C) individuals' interactions with equipment and inventory disposed on the equipment; (D) when equipment has been moved to a given location; and/or (E) when an item is misplaced. In 716, patterns of (A)-(E) can also be learned. If the equipment has been moved to a given location, then 718 can be performed to reset learned information therefore. Subsequently, 720 is performed where method 700 ends or other processing is performed.

The patterns of changes in the amounts of inventory for given items can be detected by: analyzing POS transaction information to keep a count of how many units of a given item have been sold, rented, and/or loaned; and the time of year at which the transactions occurred. For example, if a first time is sold, then a counter for the first item's inventory is decremented, and/or a counter for the number of first item sales is incremented. At certain times of year (e.g., the holiday season), a retail store may experience increased sales of certain products. It is beneficial to keep track of this information to optimize sales by ensuring that a particular amount of inventory is at the retail store during those times of year.

The patterns of theft can be detected by (for example): tracking which items are being stolen at what times of year; and identify peak times of year when certain items are being stolen. This identification can then be used to initiate added measures to prevent theft of the certain items at those times of year (e.g., such as placing the product displays in areas where surveillance is increased or in areas where they will be more exposed).

As noted above, the present solution is applicable to single facility scenarios and multiple facility scenarios. For example, in some scenarios, retail locations in a chain usually have the same appearance and layout. If there is a brand new Store B, the knowledge and learning from a similar Store A could be used to initially configure new equipment in Store B. As Store B acquires knowledge, it could fine-tune or overlay the learning inherited from Store A until Store B's local knowledge database iteratively becomes more specific to Store B's environment. So not only does an inventory system learn, but it can help "train" other inventory systems which are newly installed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for machine learning inventory management, comprising:
   capturing images by a plurality of image capture devices of different types;
   reading, by a reading device, item identification codes for items represented in the images;
   using at least a first portion of the images and known physical appearances of a plurality of items by a machine learning algorithm running on a computing device to learn relationships between the items represented in the images and the item identification codes;
   using, by the computing device, the machine learned relationships to provide full inventory coverage and generate models for generating predicted future inventory states and inventory decisions without human assistance; and
   performing actions by the computing device to control an inventory system based on the predicted future inventory states and inventory decisions.

2. The method according to claim 1, wherein the plurality of image capture devices comprise at least one of a visual camera, a 3D camera, and a thermal camera.

3. The method according to claim 1, further comprising using Point of Sale ("POS") transaction information to learn patterns of changes in amounts of inventory over time.

4. The method according to claim 1, further comprising using at least a second portion of the images which were captured at a Point of Sale ("POS") to identify items represented therein based on the learned relationships between the items represented in the first portion of images and the item identification codes.

5. The method according to claim 1, further comprising using the images, the known physical appearances, the item identification codes, and Point of Sale ("POS") transaction information to detect theft and learn patterns of theft over time.

6. The method according to claim 1, further comprising analyzing the images to learn changes in item packaging.

7. The method according to claim 6, wherein the changes in image packaging are further learned based on at least one of the item identification codes, Point of Sale ("POS") transaction information, and stored information for display equipment inventory.

8. The method according to claim 1, further comprising using at least a second portion of the images to learn at least one of a change in a type of item disposed on a piece of equipment and a change in an amount of an item disposed on a piece of equipment.

9. The method according to claim 1, further comprising using at least a second portion of the images to learn conditions of equipment or areas adjacent to the equipment.

10. The method according to claim 1, further comprising using at least a second portion of the images to learn individuals' interactions with equipment and inventory disposed on the equipment.

11. The method according to claim 1, further comprising using at least a second portion of the images to learn when equipment has been moved to a given location, and resetting learned information for the equipment.

12. The method according to claim 1, further comprising using at least a second portion of the images to learn when an item has been misplaced.

13. A system, comprising:
   a processor; and
   a non-transitory computer-readable storage medium comprising programming instructions that are configured to cause the processor to implement a method for machine learning inventory management, wherein the programming instructions comprise instructions to:
      obtain images captured by a plurality of image capture devices of different types;
      obtain item identification codes read for items represented in the images; and
      use at least a first portion of the images and known physical appearances of a plurality of items by a machine learning algorithm to learn relationships between the items represented in the images and the item identification codes;
      use the machine learned relationships to provide full inventory coverage and generate models for generating predicted future inventory sales and inventory decisions without human assistance; and
      cause actions to be performed to control an inventory system based on the predicted further inventory states and inventory decisions.

14. The system according to claim 12, wherein the plurality of image capture devices comprise a visual camera, a 3D camera, and a thermal camera.

15. The system according to claim 12, wherein the programming instructions further comprise instructions to use Point of Sale ("POS") transaction information to learn patterns of changes in amounts of inventory for given items over time.

16. The system according to claim 12, wherein the programming instructions further comprise instructions to use at least a second portion of the images which were captured at a Point of Sale ("POS") to identify items represented therein based on the learned relationships between the items represented in the first portion of images and the item identification codes.

17. The system according to claim 12, wherein the programming instructions further comprise instructions to use the images, the known physical appearances, the item identification codes, and Point of Sale ("POS") transaction information to detect theft and learn patterns of theft over time.

18. The system according to claim 12, wherein the programming instructions further comprise instructions to analyze the images to learn changes in item packaging.

19. The system according to claim 18, wherein the changes in image packaging are further learned based on at least one of the item identification codes, Point of Sale ("POS") transaction information, and stored information for display equipment inventory.

20. The system according to claim 12, wherein the programming instructions further comprise instructions to use at least a second portion of the images to learn at least one of a change in a type of item disposed on a piece of equipment and a change in an amount of an item disposed on a piece of equipment.

21. The system according to claim 12, wherein the programming instructions further comprise instructions to use at least a second portion of the images to learn conditions of equipment or areas adjacent to the equipment.

22. The system according to claim 12, wherein the programming instructions further comprise instructions to use at least a second portion of the images to learn individuals' interactions with equipment and inventory disposed on the equipment.

23. The system according to claim 12, wherein the programming instructions further comprise instructions to use at least a second portion of the images to learn when equipment has been moved to a given location, and resetting learned information for the equipment.

24. The system according to claim 12, wherein the programming instructions further comprise instructions to use at least a second portion of the images to learn when an item has been misplaced.

* * * * *

UNITED STATES PATENT AND TRADEMARK OFFICE
CERTIFICATE OF CORRECTION

PATENT NO. : 10,706,386 B2
APPLICATION NO. : 15/704534
DATED : July 7, 2020
INVENTOR(S) : Steve E. Trivelpiece et al.

Page 1 of 1

It is certified that error appears in the above-identified patent and that said Letters Patent is hereby corrected as shown below:

In the Specification

Column 2, Line 1, delete "DESCRIPTION OF THE DRAWINGS" and insert -- BRIEF DESCRIPTION OF THE DRAWINGS --, therefor.

Column 3, Line 49, delete "well." and insert -- well). --, therefor.

Column 8, Line 52, delete "date 116" and insert -- data 116 --, therefor.

Column 8, Line 62, delete "If such" and insert -- In 610, if such --, therefor.

Column 11, Line 38, delete "636" and insert -- 638 --, therefor.

Signed and Sealed this
Sixth Day of October, 2020

Andrei Iancu
*Director of the United States Patent and Trademark Office*